United States Patent [19]
Vollink

[11] Patent Number: 5,337,986
[45] Date of Patent: Aug. 16, 1994

[54] POST MOUNTED HANGER

[75] Inventor: Dan H. Vollink, Whitehall, Mich.

[73] Assignee: Dec-Kor, Inc., Whitehall, Mich.

[21] Appl. No.: 111,973

[22] Filed: Aug. 25, 1993

[51] Int. Cl.$^5$ .............................................. A47B 96/06
[52] U.S. Cl. .................................. 248/218.4; 211/107;
248/219.4
[58] Field of Search ............... 248/231, 218.4, 219.1,
248/219.4; 211/107

[56] References Cited

U.S. PATENT DOCUMENTS

| | | |
|---|---|---|
| D. 261,454 | 10/1981 | Hobrecht . |
| 58,712 | 10/1866 | Beckwith . |
| 107,260 | 9/1870 | Hoover . |
| 114,279 | 5/1871 | Elliott . |
| 131,241 | 9/1872 | Arnold . |
| 575,857 | 1/1897 | Sly .......................... 248/231 |
| 661,565 | 11/1900 | Ticknor .................... 211/107 X |
| 794,645 | 7/1905 | Springen . |
| 985,079 | 2/1911 | Venard ..................... 248/231 |
| 1,050,364 | 1/1913 | Kobert . |
| 1,206,574 | 11/1916 | Miller . |
| 1,239,938 | 9/1917 | Mrasek . |
| 1,408,900 | 3/1922 | Miller ....................... 248/231 |
| 1,493,189 | 5/1924 | Careroto ................... 211/107 |
| 1,528,268 | 3/1925 | Schlegel .................... 248/231 X |
| 1,592,530 | 7/1926 | Lee . |
| 1,712,974 | 5/1929 | Venard ...................... 248/231 X |
| 1,866,530 | 7/1932 | Funk ........................ 248/219.4 X |
| 2,089,370 | 8/1937 | Heinrich et al. . |
| 2,517,286 | 8/1950 | Cooper . |
| 2,848,117 | 8/1958 | Miller . |
| 2,855,980 | 10/1958 | Konieczka ................. 248/231 |
| 3,368,725 | 2/1968 | Martin . |
| 3,746,294 | 7/1973 | Johnston . |
| 4,415,137 | 11/1983 | Garves . |
| 4,569,497 | 2/1986 | Elmer . |
| 4,744,537 | 5/1988 | Buckley . |

FOREIGN PATENT DOCUMENTS 900860 7/1945 France ......................... 211/107

*Primary Examiner*—J. Franklin Foss
*Attorney, Agent, or Firm*—Price, Heneveld, Cooper, DeWitt & Litton

[57] ABSTRACT

The specification discloses a hanging-plant support assembly with rigid object-support bracket with a post-engaging base, secured to a post by means of a post-engaging band with end hooks which hook over hooks on an attachment bar which extends through one of a plurality of apertures in the bracket.

18 Claims, 4 Drawing Sheets

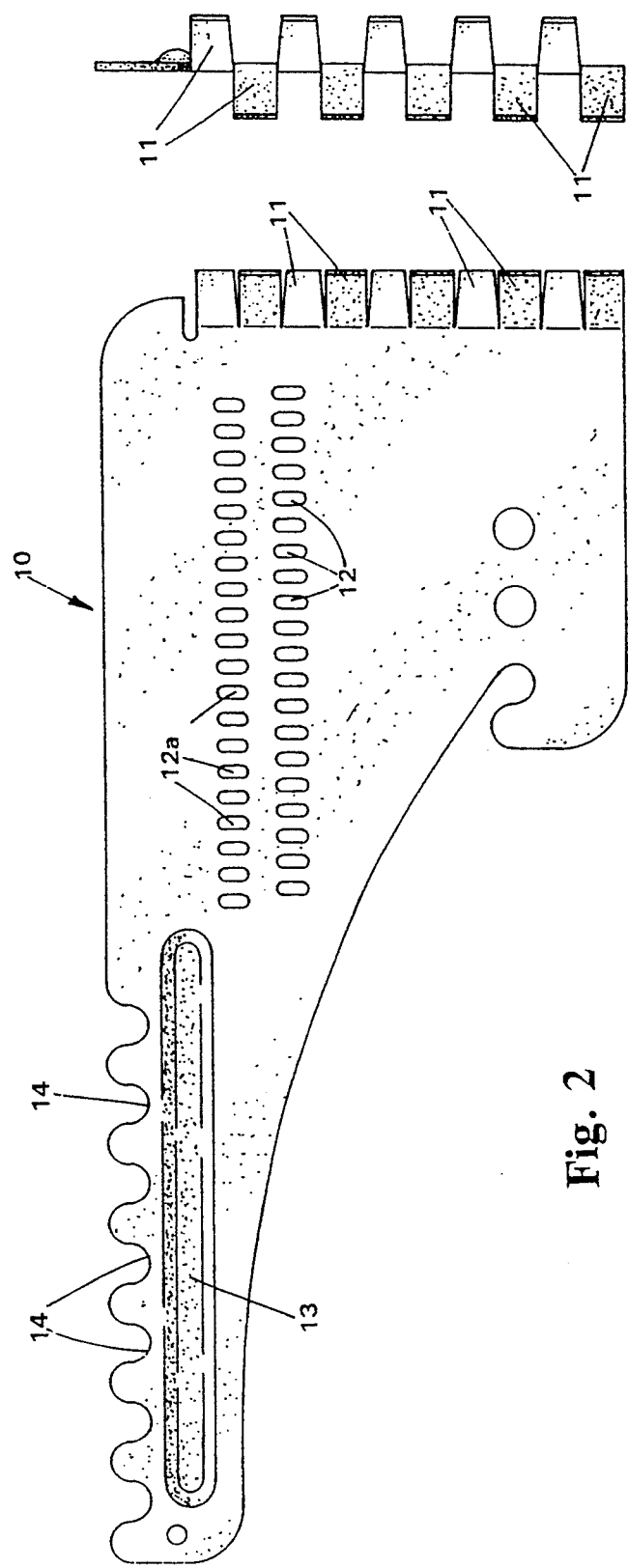
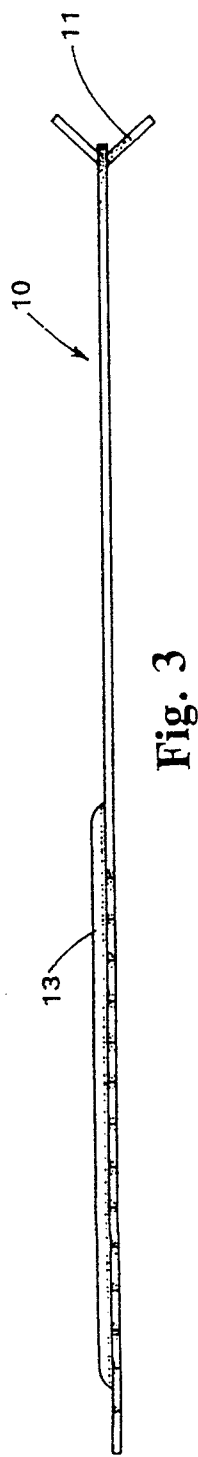

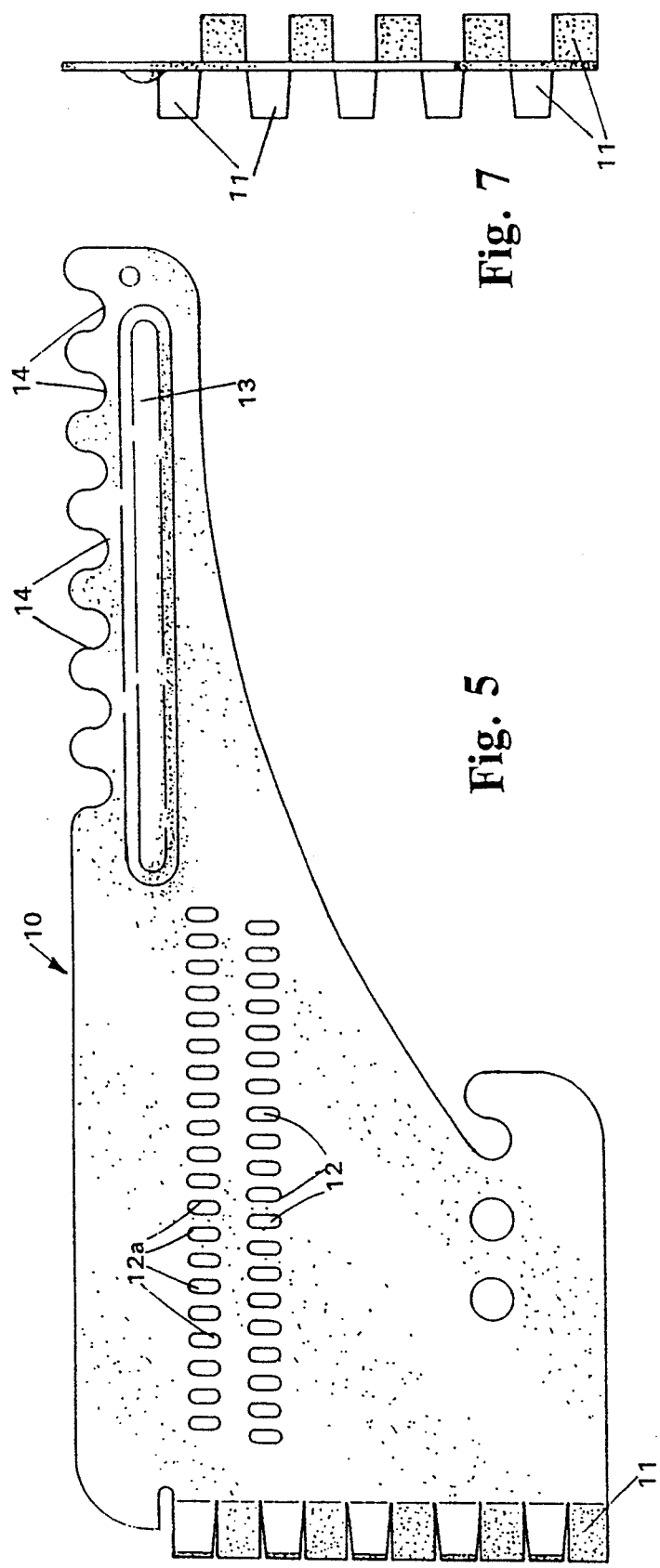

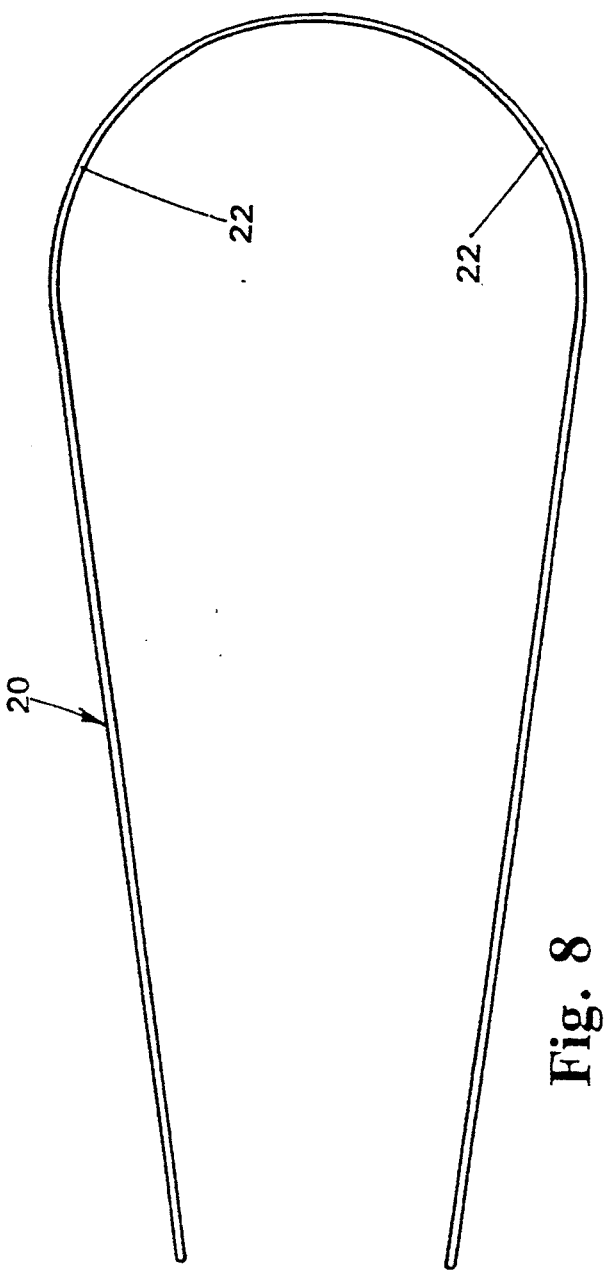
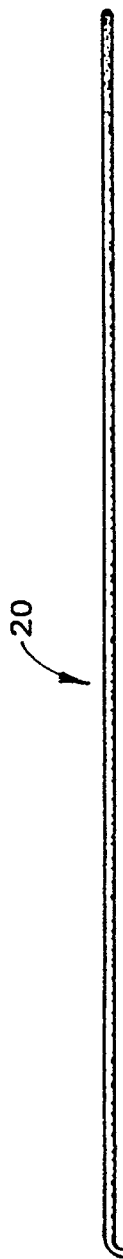
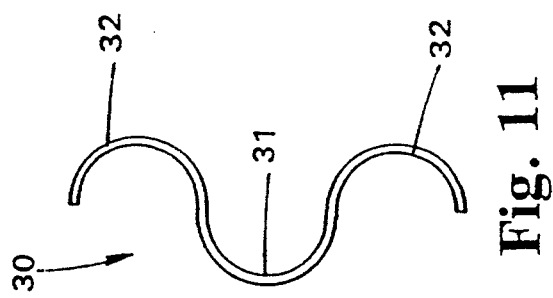
Fig. 8
Fig. 9
Fig. 11
Fig. 10

POST MOUNTED HANGER

BACKGROUND OF THE INVENTION

The present invention relates to devices for supporting hanging pots and similar ornamentation from cylindrical posts of varying circumferences.

Hanging plants, lamps, and the like from cylindrical posts generally requires disfigurement of the post. This is particularly true in the case of wooden posts, where the common method for attaching such ornamentation requires the use of threaded hooks.

Still other less common methods are disclosed in the prior art. For example, U.S. Pat. No. 1,050,364 discloses a cable supporting device which employs a flexible-band and wedge assembly. At the user's discretion, a wider or more narrow portion of the wedge is inserted between the post and the cable supporting portion of the device, such that the flexible-band securely engages the exterior circumference of the post. By controlling the width of the wedge between the post and the cable support, the entire unit can accommodate posts of a variety of circumferences.

U.S. Pat. No. 4,744,537 takes a different approach, disclosing a pair of elastic bands which support the base and object-support arm of a bracket assembly. By virtue of the elasticity of the bands, this bracket can be mounted on posts of varying circumferences.

U.S. Pat. No. 4,415,137 employs a rigid, post-embracing, "U"-shaped hook coupled to a canted, resilient, object-support bracket. Positioned on opposite sides of a post, the "U"-shaped hook and resilient support bracket are mounted such that the resilient support bracket forces the "U"-shaped hook towards the post, ensuring a secure fit. Depending upon the resiliency of the material from which the object-support bracket is fashioned, as well as the length of the "arms" of the "U"-shaped hook, and the point at which they attach to the resilient support arm, the '137 bracket is capable of mounting to posts of varying circumferences.

SUMMARY OF THE INVENTION

The post-mountable hanger of the present invention comprises a post-engaging band and an object-supporting member with a post-engaging base. At least one attachment opening on the support member receives an attachment bar, to which the post-engaging band can be secured to ensure that the object-support member securely engages the post.

These and other features, objects and advantages of the invention will be more fully understood and appreciated by reference to the drawings and the detailed description of the preferred embodiment set forth below.

BRIEF DESCRIPTION OF THE DRAWINGS

FIG. 2 shows a left side elevational view of the object-support bracket;

FIG. 3 shows a top plan view of the object-support bracket;

FIG. 4 shows a rear elevational view of the object-support bracket (looking from the post engaging/end towards the object-supporting end);

FIG. 5 shows a right side elevational view of the object-support bracket;

FIG. 6 a bottom plan view of the object-support bracket;

FIG. 7 illustrates a front elevational view of the object-support bracket (looking towards the post engaging flanges);

FIG. 8 depicts a top plan view of the generally "U"-shaped, rigid post attachment band;

FIG. 9 illustrates a left side elevational view of the generally "U"-shaped, rigid post attachment band;

FIG. 10 shows a left side elevational view of the generally "W"-shaped connecting bar; and FIG. 11 illustrates a top plan view of the generally "W"-shaped, rigid attachment bar.

DESCRIPTION OF THE PREFERRED EMBODIMENT

Figure 1:
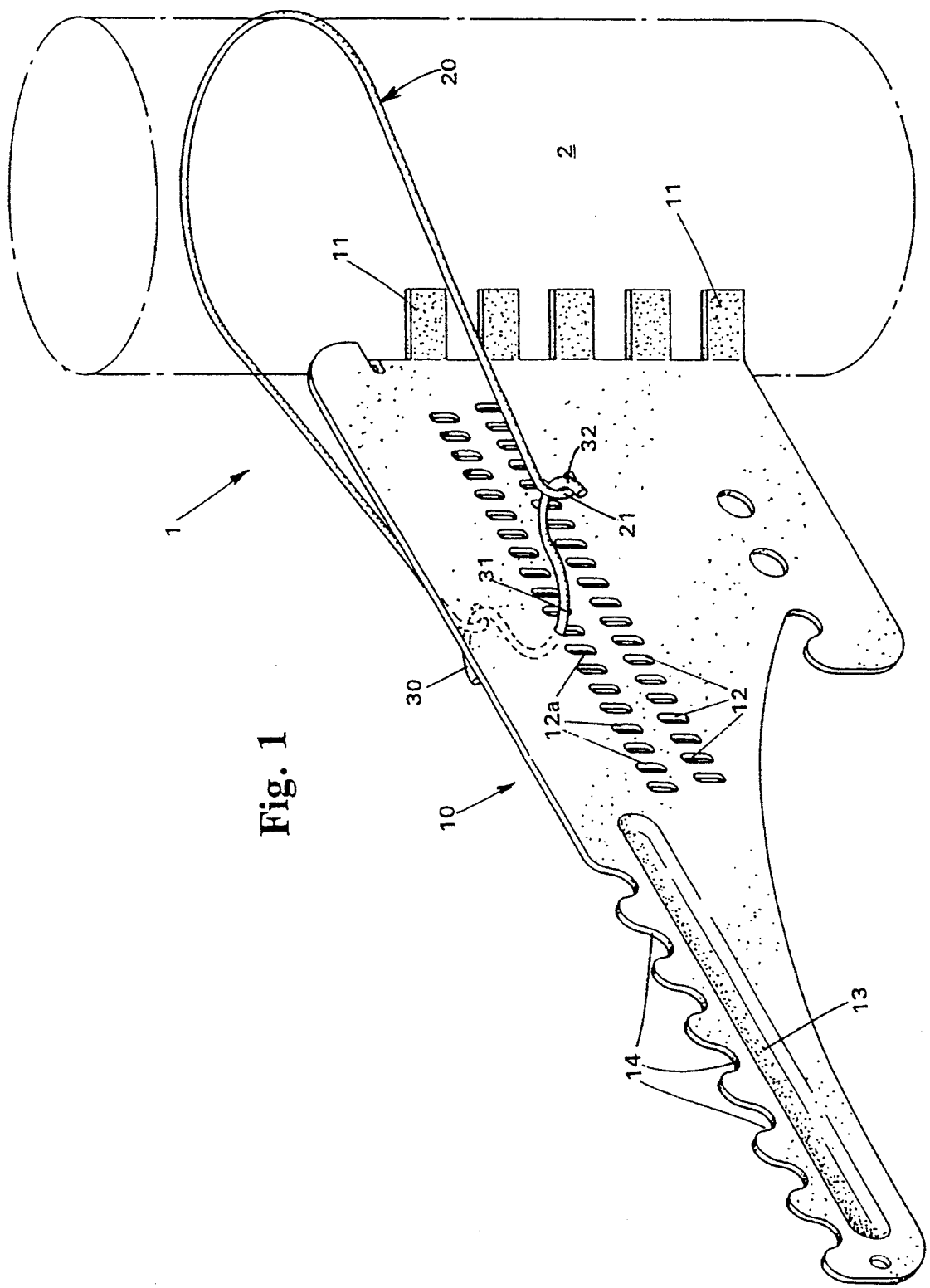
FIG. 1 illustrates a perspective view of the entire bracket unit mounted to a post.

As shown in FIG. 1, the preferred hanging unit 1 includes an object-support bracket 10 attached to the face of a cylindrical post by the combined use of an attachment band or wire 20, a series of flanges 11 protruding from either side of the object-support bracket 10 defining a post-engaging base, and a generally "W"-shaped attachment bar 30 for connecting object-support bracket 10 with attachment band 20. To accommodate posts of varying diameters, object-support bracket 10 contains two rows of equally spaced holes 12 and 12a, respectively, which accommodate attachment bar 30. As shown in FIGS. 1, 2, and 5, these holes extend in two straight, parallel lines, which lines extend approximately perpendicular to the post 2. The attachment holes 12a closer to the top of object-support bracket 10 have a staggered spacing with respect to the row of holes 12 more centrally located on bracket 10 (FIG. 1). Thus, where an imaginary line perpendicular to both rows of holes (but parallel to the post 2) bisects any one attachment hole on either the more dorsally or ventrally located row of holes, it will not also bisect a hole in the adjacent row. Since the spacing between any two attachment holes 12 on either row is approximately one-quarter of an inch, this staggered, two-row arrangement permits the entire bracket unit 1 to accommodate posts ranging from diameters of an inch and one-half to four inches, at one-eighth inch increments.

Also integral to object-support bracket 10 are two rows of post-engaging flanges 11, which extend alternately to either side of object-support bracket 10. Bracket 10 can thus be stamped of a single piece of metal. As FIGS. 2, 3 and 4 illustrate, every other flange 11 of object-support bracket 10 extends in the same direction away from the object-support bracket 10, such that the angle between adjacent flanges 11 is approximately 90°. When the entire hanger assembly is mounted to a post, as in FIG. 1, flanges 11 provide a post-engaging base which prevents any significant lateral motion of object-support bracket 10.

As seen in FIG. 5, object-support bracket 10 is also characterized by an integral, raised, structural support rib 13, located just below a series of grooves 14, designed to support the hanging plant, lamp, or the like. Attachment band 20 is formed of a fairly stiff wire or like nonelastic material. It can be flexed sufficiently to facilitate attachment to attachment bar 30, but it tends to maintain its predetermined configuration. "W"-shaped attachment bar 30 is formed of a similar stiff wire.

Band 20 is generally "U"-shaped, including an arcuate base portion 22 so as to fit around a post, and includes a hook 21 at each end of the "U" for hooking over attachment bar 30 (FIGS. 1, 9 and 10). Attachment bar 30 is generally "W"-shaped, comprising a central inverted "U"-shaped portion 31 which rests in a hold 12 or 12a, and which is flanked by a hook portion 32 on either side thereof (FIGS. 1 and 11). Hook portions 32 project from portion 31 back towards post 2. Hooks 21 on band 20 hook over hooks 32.

When unit 1 is assembled, the post 2 on which the unit is mounted comes in contact with some or all of the generally arcuate base portion 22 of band 20 (FIG. 1). Attachment bar 30 is extended into and engages a hole 12 or 12a in object-supporting bracket 10 at location 31, while hooks 21 of post-embracing band 20 hook over hooks 32 of bar 30. To accommodate posts of different diameters, attachment bat, 30 is simply moved forward or backward, as desired, in either of the parallel rows of holes 12 or 12a on object-support bracket 10 prior to connecting post-attachment band 20 to connecting hooks 32 of attachment bar 30.

When each of these three components, object-support bracket 10, attachment bar 30, and post-embracing band 20, are adjusted and connected in this manner, the entire hanger assembly 1, as shown in FIG. 1, will fit securely around the desired post. The entire hanger assembly 1, thus assembled, is capable of then supporting a hanging plant, lamp, or the like; the rigid post-embracing band 20 and the opposing flanges 11 of object-support bracket 10 securely engaging the post to prevent significant lateral movement of the object-support bracket 10 or vertical movement of the entire hanger assembly 1.

Of course, it is well understood that the above is merely a preferred embodiment of the invention and that various changes, alterations and modifications, apparent to those skilled in the art, can be made without departing from the spirit and broader aspects thereof.

The embodiments of the invention in which an exclusive property or privilege is claimed are defined as follows:

1. A hanger assembly for supporting hanging plants, lamps, and the like from a post comprising:
   a rigid support bracket having a post-engaging base and at least one aperture in said bracket for receiving an attachment bar;
   a stiff, integral post-engaging band having a "U"-shaped post-engaging base portion and integrally formed hooks projecting from each end of said "U"-shaped post-engaging base portion; and
   an attachment bar extending through said aperture in said bracket, said hooks at each end of said post-engaging band hooking over said attachment bar on either side of said support bracket whereby said post-engaging base of said bracket is held in abutting engagement with the post.

2. The hanger assembly of claim 1, in which there are a plurality of said apertures in said rigid support bracket, extending progressively away from said base, whereby said hanger assembly can be fitted onto posts of different sizes by locating said attachment bar in a particular one of said apertures.

3. The hanger assembly of claim 2, in which said post-engaging base comprises a plurality of flanges projecting from said support bracket, at least one projecting in one direction from said bracket and at least another projecting in the opposite direction from said bracket.

4. The bracket of claim 3, in which there are a plurality of said flanges projecting to either side of said bracket, and arranged such that every other flange protrudes away from said bracket in the same direction.

5. The bracket of claim 4, in which said flanges protrude away from the plane of said bracket at an angle of approximately 45°, such that the angle between adjacent flanges is approximately 90°.

6. The bracket of claim 5, wherein said apertures comprise two parallel rows, extending longitudinally from one end of said support bracket, wherein said rows of apertures are staggered, such that an imaginary line, perpendicular to the length of the row, drawn through any one hole would not likewise intersect any other hole in the adjacent row of said apertures.

7. The bracket of claim 6, in which said attachment holes are evenly spaced within each row, at about one-quarter inch increments.

8. The hanger of claim 7, in which said post-engaging band is made of a metal wire.

9. The hanger of claim 8, wherein said attachment bar is constructed of a metal rod.

10. The hanger of claim 9, in which said attachment bar has a generally "W"-shaped configuration, having an inverted "U"-shaped portion engaging said aperture in said bracket and a hook projecting from either side of said "U"-shaped portion.

11. The hanger of claim 10, wherein said bracket has a series of grooves for supporting plants or like ornamentation at a variety of distances from said post-engaging base.

12. The hanger of claim 11, wherein said grooves are located generally directly above a protruding, structural support rib integral to said bracket.

13. The bracket of claim 2, wherein said apertures extend longitudinally from one end of said support bracket, wherein said rows of apertures are staggered, such that an imaginary line, perpendicular to the length of the row, drawn through any one hole would not likewise intersect any other hole in the adjacent row of said apertures.

14. The hanger of claim 2, in which said attachment bar has a generally "W"-shaped configuration, having an inverted "U"-shaped portion engaging said aperture in said bracket and a hook projecting from either side of said "U"-shaped portion.

15. The hanger of claim 2, in which said attachment bar has a generally "W"-shaped configuration, having an inverted "U"-shaped portion engaging said aperture in said bracket and a hook projecting from either side of said "U"-shaped portion.

16. The bracket of claim 1, wherein said apertures comprise two parallel rows, extending longitudinally from one end of said support bracket, wherein said rows of apertures are staggered, such that an imaginary line, perpendicular to the length of the row, drawn through any one hole would not likewise intersect any other hole in the adjacent row of said apertures.

17. A hanger assembly for supporting hanging plants, lamps, and the like from a post comprising:
   a rigid support bracket having a post-engaging base and two rows of apertures in said bracket for receiving an attachment bar;
   a post-engaging band having a post-engaging base portion and integrally formed hooks projecting from each end of said post-engaging base portion; and
   an attachment bar extending through said aperture in said bracket, said hooks at each end of said post-engaging band hooking over said attachment bar on either side of said support bracket whereby said post-engaging base of said bracket is held in abutting engagement with the post.

18. A hanger assembly for supporting hanging plants, lamps, and the like from a post comprising:
   a rigid support bracket having a post-engaging base and two rows of apertures in said bracket for receiving an attachment bar;
   a post-engaging band having a post-engaging base portion and hooked ends projecting from either side of said post-engaging base portion;
   an attachment bar engaging said bracket at said aperture and extending to either side of said bracket, said hooks on said post-engaging band hooking over said attachment bar on either side of said support bracket whereby said post-engaging base of said bracket is held in abutting engagement with the post;
   said attachment bar having a generally "W"-shaped configuration with an inverted "U"-shaped portion engaging said aperture in said bracket and a hook projecting from either side of said "U"-shaped portion.

* * * * *

UNITED STATES PATENT AND TRADEMARK OFFICE
CERTIFICATE OF CORRECTION

PATENT NO. : 5,337,986
DATED : August 16, 1994
INVENTOR(S) : Dan H. Vollink

It is certified that error appears in the above-indentified patent and that said Letters Patent is hereby corrected as shown below:

Column 3, line 12:
   "iin" should be --in--.

Column 3, line 15:
   "bat, 30" should be --bar 30--.

Column 4, line 45, claim 15:
   "claim 2" should be --claim 1--.

Signed and Sealed this

Fourteenth Day of March, 1995

*Attest:*

BRUCE LEHMAN

*Attesting Officer*   *Commissioner of Patents and Trademarks*